Feb. 20, 1951 R. RADOM 2,542,092

RESONANT NETWORK SYSTEM

Filed Oct. 28, 1947

Inventor
Robert Radom
By Seymour, Earle & Nichols
Attorneys

Patented Feb. 20, 1951

2,542,092

UNITED STATES PATENT OFFICE 2,542,092

RESONANT NETWORK SYSTEM

Robert Radom, Old Saybrook, Conn.

Application October 28, 1947, Serial No. 782,629

10 Claims. (Cl. 250—1)

Figure 1:
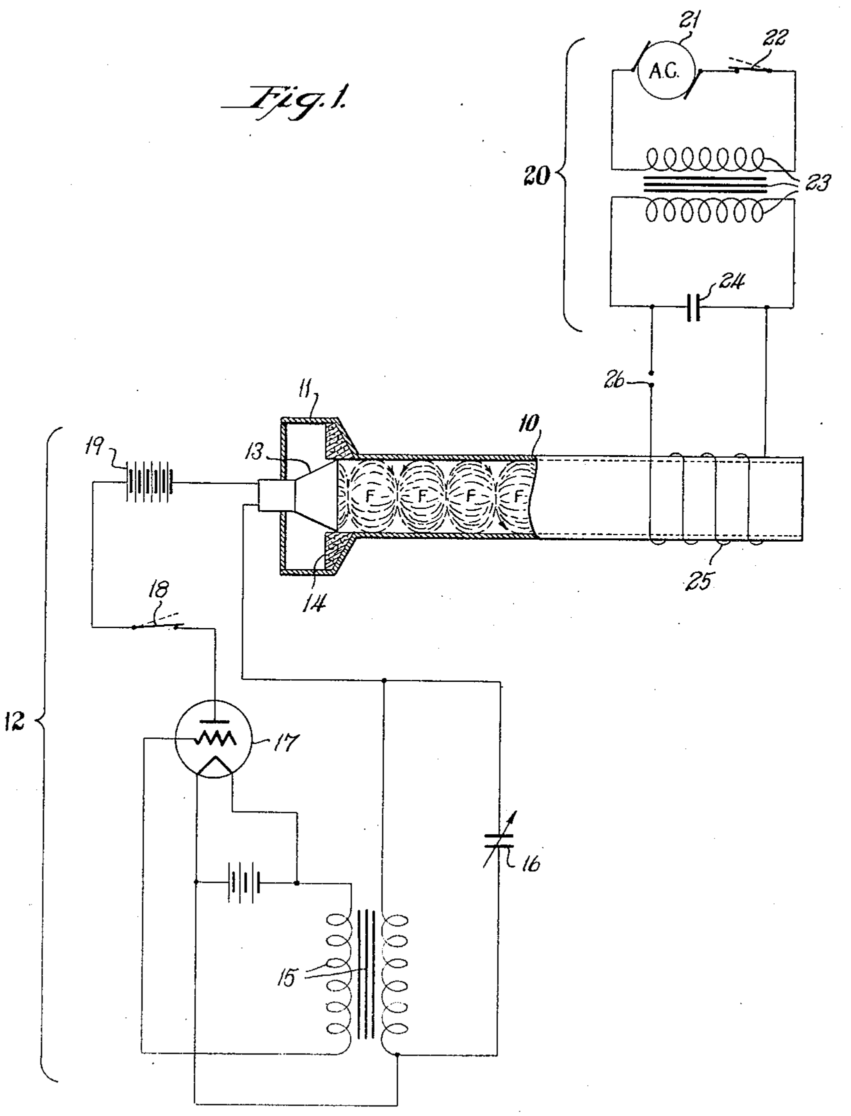

The present invention relates in general to a teledynamic system and more especially to a method and means for the development, transmission and utilization of radiant energy, and in particular electromagnetic waves such as may be employed in wireless transmission and other special ray work.

Heretofore systems for the transmission and utilization of electromagnetic and electrostatic energy in the form of electromagnetic waves have, in general, utilized vacuum discharge oscillators for generating high-frequency alternating currents. While these systems are satisfactory for most purposes, it is commonly known that the physical limitations of the circuits are such as to preclude the use of an extremely high input-power or a highly-efficient conversion of power at very high frequencies.

An object of the present invention is the provision of an efficient method of converting electrical energy into radiant energy and more especially electromagnetic waves.

A further object is to provide an efficient method of utilizing high input-power in high-frequency teledynamic systems.

A further object is to provide a new method and means for forming a network of mutually-coupled resonant oscillatory electric fields for the development and transmission of powerful electromagnetic waves.

A still further object is the provision in space of a sound field and means for exciting the sound field to convert the sound field into a progressive series of mutually-coupled resonant oscillatory electrical circuits.

A still further object is to provide a sound field in a fluid-medium for spatially orienting the molecules thereof into a series of characteristic patterns or molecular bounded regions, and ionizing the molecular bounded regions within the sound field so as to set up resonant circuits in each of the ionized molecular bounded regions to provide a network of mutually-coupled resonant oscillating fields for the development and transmission of electromagnetic waves.

A still further object is to convert ionized molecular patterns into mutually-coupled oscillating electromagnetic fields.

With the above and other objects in view, as will appear to those skilled in the art from the present disclosure, this invention includes all features in the said disclosures which are novel over the prior art.

In the accompanying drawing, in which certain modes of carrying out the present invention are shown for illustrative purposes:

The figure is a schematic illustration of the apparatus of this invention for developing and transmitting electrical energy in the form of electromagnetic waves.

Although the apparatus disclosed in the drawing referred to above is a preferred means for carrying out the invention, it is to be understood that the apparatus shown herein is primarily for the purpose of illustrating an exemplary embodiment of the invention and that it is within the purview of the invention, as defined by the appended claims, to provide other equivalent means for carrying out the invention as set forth herein.

In carrying out the method of the present invention, a progressive series of mutually-coupled resonant oscillating electrical fields are formed in space, each field comprising ionized molecules oriented in space to form closed molecular paths for the flow of the ionized molecules, such closed molecular paths bounding hollow regions consisting of a plurality of oscillatory circuits capable of exciting an oscillating electric field. That is to say, these oscillating circuits have inductance, capacitance and resistance characteristics. However, since they are independent of the usual physical limitations of high frequency oscillatory circuits, very high input-power may be utilized for the development of electromagnetic waves, whose wave lengths are of the same order of magnitude as the dimensions of the progressive series of resonant oscillatory circuits formed in space.

The creation of these mutually-coupled resonant oscillating electric fields, i. e., electromagnetic and electrostatic, in space is accomplished by the excitation of a dielectric fluid-medium to form a progressive series of hollow regions each consisting of a plurality of closed molecular paths and hereinafter termed "molecular field patterns," the excitation of the fluid-medium being effected preferably by the joint action thereon of kinetic energy in the form of a sound wave of pressure front; and electrical energy. The term "sound wave" as used in the specification is to be understood to include vibrational energy in the audio-frequency range as well as at frequencies both below and above audio-frequencies, the latter being known as supersonic frequencies. With the development of molecular field patterns in the fluid-medium by sound waves, the successive molecular field patterns are mutually coupled together at the nodal boundaries thereof, to form a network of molecular field patterns. After the mutually-coupled molecular field patterns have been formed in the fluid-medium, they are adapted to be ionized by electrical energy, the ionization of these molecular field patterns being accompanied simultaneously or subsequently by an induced alternating electromotive force, as a consequence of which each ionized mutually-coupled molecular field pattern of the fluid-medium assumes the characteristics of a closed field resonator, each of which has a natural frequency and is adapted to be in resonance with other oscillatory fields of the same natural frequency, or at corresponding harmonics thereof, to form a mutually-coupled resonant network. The means used to excite oscillating currents in the ionized molecular field patterns of the fluid-medium to develop oscillating electric fields is preferably a high-potential relatively-low frequency power-input circuit, the frequency of this circuit being in the lower range of the radio frequency spectrum, but capable of effecting molecular vibration.

By practicing the above-described method in the manner and by the means hereinafter described, it has been found that the frequencies of the electromagnetic waves developed and transmitted by the network of resonant oscillating electric fields greatly exceed the frequencies of the input circuit. The theoretical explanation of this discovery is not exactly known, but is believed to be due to the magnitudes which characterize the capacitance, inductance and resistance elements of the resonant circuits of each of the individual ionized molecular field patterns.

The natural frequencies of the resonant circuits of the respective ionized molecular field patterns have been found to vary, depending upon the particular configuration of the pattern which, in turn, depends in part upon the nature and characteristics of the dielectric medium within which the ionized molecular patterns occur. Moreover, those field patterns which have the same natural frequency, or harmonics thereof, will be in resonance, and inasmuch as they are coupled together and recur progressively throughout the fluid-medium, they form a network of mutually-coupled resonant oscillating electric fields capable of developing and transmitting powerful electromagnetic waves of extremely high frequencies. Those resonant circuits which have different natural frequencies will remain ineffective and in effect are filtered out.

As pointed out above, the excitation of a fluid-medium to form molecular field patterns is accomplished by kinetic energy in the form of a pressure-front or sound wave. Where it is proposed to use a sound wave, the excitation of the fluid-medium by the sound wave forms a sound field comprising a progressive series of sonic molecular field patterns. When this sound field is ionized as described above, the sonic molecular field patterns of the ionized sound field, hereinafter termed the "ionosonic" field, assume the characteristics of confined field or cavity resonators. In this connection, it has been discovered that by using sound waves of supersonic frequencies, the ionosonic field will develop very marked directional properties, the dispersion of the ionosonic field being limited to substantially a five-degree angle, as a consequence of which the electromagnetic waves assume a relatively-narrow beam-like form.

With respect to the fluid-medium used, any dielectric fluid-medium having physical characteristics such that its ionized molecules may be spatially oriented in a predetermined arrangement by a sound wave is satisfactory, but for the purposes of illustrating the invention, a fluid-medium comprising ordinary atmospheric air, at normal pressure, is preferred.

Although it is possible to excite a large body of air by means of a sound wave and hence to create a proportionately-extensive sound field consisting of a plurality of molecular field patterns arranged in a predetermined order depending upon such factors as the intensity of the sound, the number and location of the sound sources, and the physical characteristics of the fluid-medium, it has been found preferable to form the sound field by directing the sound wave or pressure-front against a partially-confined body of air. For example, by providing an envelope comprising a substantially-cylindrical surface of revolution, the molecular field patterns formed in the sound field within the cylindrical envelope at certain frequencies are characteristic of the wave patterns of electromagnetic forces traveling through hollow-pipe wave-guides. It is to be understood that the intensity of the sound, the number and location of the sound sources and the particular shape of the envelope which partially confines the fluid-medium are factors in determining the configuration of the molecular field patterns formed in the sound field within the envelope, and that envelopes of innumerable sizes and shapes may be selected, depending upon the configuration of the sound patterns desired. Moreover, it has been found that the material of which the envelope is made affects the configuration of the molecular field patterns and that an envelope comprising a nonmetallic material, as hereinafter described, provides superior performance.

Referring now to the drawing, the latter discloses one form of apparatus for developing and transmitting electromagnetic waves in space in accordance with the method described above. The apparatus shown comprises envelope-means, indicated generally at 10, which is preferably a cylindrical tube substantially five-eighths inch thick, having an outside diameter of five and one-quarter inches, and substantially twenty-six inches long, the tube being formed of a non-metallic material such as, for example, a ceramic, asbestos fiber, quartz or equivalent material. The tube 10 is closed at one end, as hereinafter described, but it is to be understood that the tube may be open at both ends or that both ends of the tube may be closed or partially closed by a suitable diaphragm or grid. If the tube is closed at each end, then it is essential that the tube contain a column of air or other fluid-medium.

Opposite the rear end 11 of the tube 10 is located suitable means, indicated generally at 12, for developing a sound field in the air column within the tube. Any one or more than one of many known means for creating a sound field within the tube 10 may be used such as, for example, a sparkgap, piezoelectric sound-generator, magnetostriction device or an electrically-operated horn, but for the purposes of illustration, the device shown at 12 in the drawing comprises a conventional audio-frequency circuit having a loudspeaker-unit 13 which is supported by suitable nonresonant mounting-means 14 as, for example, felt padding or the like, in the end 11 of the tubular envelope 10. The loudspeaker-unit 13 is adapted to be energized by a circuit, including the mutual inductance of an iron core-transformer 15 having primary and secondary windings in the ratio of 1 to 1, a capacitance provided by a variable condenser 16, and a triode tube 17. By adjusting the variable condenser 16, vibrations of any audio-frequency are adapted to be impressed on the loudspeaker-unit 13. In use, a frequency of substantially 3400 cycles per second has given satisfactory performance. The circuit also includes a switch 18 and a battery 19, the latter being preferably ninety volts.

It will be clear that when the switch 18 of the circuit 12 is closed, the loudspeaker 13 will create a sound field within the air-column of the tube 10 having unidirectional movement therethrough and consisting of a progressive series of sound waves, this sound field comprising molecular field patterns of predetermined configuration, as shown at F in the figure, coupled together at their nodal boundaries, the configuration of the mutually-coupled molecular field patterns F being determined by the intensity of the sound, number and location of sound sources, the physical characteristics of the air-column and the size, shape and material of the tube 10.

Associated with the tube 10 is a power-input circuit adapted, in this instance, both to ionize the sound field which has been created within the tube by the energized loudspeaker 13 and to alternate the flow of current in the closed molecular paths of the mutually-coupled molecular field patterns F so as to excite an oscillating electric field. The power-input circuit is indicated generally at 20 and is preferably an oscillatory circuit constituting one type of electrical transient adapted to release intense bursts of energy of momentary duration for exciting the sound field within the tube 10.

For the purpose of illustration, the power-input circuit 20 is a pulse generator comprising a sixty-cycle single-phase 115-volt alternating current generator 21 connected by a circuit, including a switch 22, to an iron-core step-up transformer 23, the secondary of which is designed to deliver substantially 15,000 volts to a low-resistance oscillatory circuit comprising a capacitance indicated by a condenser 24 of substantially 0.02 microfarad, an inductance 25 consisting of substantially four turns of one-half inch copper tubing wound closely about the envelope 10 adjacent the forward end thereof, and an adjustable spark-gap 26. Although a plurality of coils of copper tubing 25 are shown, it is to be understood that any other equivalent means may be used such as, for example, a concentric metallic band wrapped around the tube 10; and that the excitation of the ionized mutually-coupled field patterns within the tube to produce resonant oscillatory circuits may be accomplished by locating the inductance-coils 25 anywhere along the tube 10 but is preferably accomplished at the forward end of the tube adjacent the boundary layer between the sound field within the tube and the air at the end of the tube, so that by reflection a plurality of interacting sound fields will be produced within the tube, the series of mutually-coupled molecular sound field patterns being the resultant molecular field patterns of the interacting sound field. When the switch 22 of the power-input circuit is closed, an intense surge of power is delivered to the oscillatory circuit which, in turn, develops a high-frequency alternating current in the coils 25 surrounding the tube 10. An alternating electromagnetic field is thus induced in the sound field within the tube 10, the effect of which is to ionize the sound field, including the molecular field patterns F thereof which comprise the ionosonic field. Since the ionization of the molecular field patterns is induced by an alternating electromotive force, each becomes a hollow region comprising a plurality of oscillating molecular circuits and thus has the characteristics of a confined field or cavity resonator.

Although the power-input or pulse-generator circuit exemplified at 20 has proven satisfactory both as means for ionizing the sound field and orienting the ionized molecules of the sound field patterns to excite an oscillating electric field, it should be pointed out that the ionization of the molecular field patterns may be effected by any suitable means, either independently of or in conjunction with the pulse-generator circuit 20.

As pointed out above, the oscillating molecular field patterns have the characteristics of mutually coupled cavity resonators, but they are, however, independent of the physical limitations of the conventional cavity resonator, as a consequence of which a very large amount of power-input may be used for developing and transmitting electromagnetic waves. This large power-input plus the magnitude of the mutually-coupled oscillating circuits and the resonance thereof cooperate to achieve the propagation of electromagnetic waves of very high frequency and great power.

The audio-frequency circuit 12 is adapted to produce sound waves in the audio-frequency range but by substituting a generator for sound waves in the supersonic frequency range, it has been found that the electromagnetic waves developed and transmitted within the tube 10 have marked directional properties, the dispersion of the electromagnetic waves being of the order of five degrees, and hence of beam-like characteristics. It will be apparent that by mounting the tube 10 for movement in horizontal and vertical planes, a beam of powerful high-frequency electromagnetic waves may be transmitted in any chosen direction.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A method of developing a substantially point source of high frequency oscillatory electromagnetic fields for the transmission of electromagnetic waves comprising the steps of impressing a high-frequency sound wave upon a non-polar fluid-medium to form a sound field comprising a series of molecular field patterns in said fluid-medium, only partially confining the molecular field patterns of said sound field, and ionizing said molecular field patterns periodically by imposing a transitory high-potential thereon to transform said ionized molecular field patterns into a network of mutually-coupled resonant oscillatory electric fields.

2. A method of developing high frequency oscillatory circuits for transmitting electromagnetic waves comprising the steps of orienting the molecules of a non-polar fluid-medium, to form a progressive series of hollow closed molecular circuits, ionizing said hollow closed molecular circuits and periodically energizing said ionized molecular closed circuits at the boundaries thereof by imposing a transitory alternating electromotive force thereon to transform said ionized molecular closed circuits into a network of mutually-coupled resonant oscillatory electric fields.

3. A device for developing a network of mutually-coupled resonant oscillating electric fields comprising means for dividing a partially-confined ionized non-polar fluid-medium into ionized field patterns, said ionized field patterns being mutually coupled at the nodal boundaries thereof; and means to excite said mutually-coupled ionized field patterns to produce oscillating electric fields resonant at substantially the same frequency.

4. A device for developing a network of mutually-coupled resonant oscillating electric fields comprising means for dividing a partially-confined ionized dielectric non-polar medium into mutually-coupled hollow molecular bounded regions; and means to excite said mutually-coupled molecular bounded regions to produce oscillating electric fields resonant at substantially the same frequency.

5. A device for developing and transmitting radiant energy comprising a non-polar fluid-medium; means constructed and arranged to develop a sound field in said fluid-medium, said sound field comprising a series of molecular field patterns in said non-polar fluid-medium and means to energize the molecular field patterns of said sound field periodically to transform said molecular field patterns into a network of mutually-coupled resonant oscillatory electric fields.

6. A device for developing and transmitting electromagnetic waves comprising a non-polar fluid-medium; means constructed and arranged to develop a sound field in said non-polar fluid-medium, said sound field comprising a series of molecular field patterns in said non-polar fluid-medium and electromagnetic-means to energize the molecular field patterns of said sound field periodically to transform said molecular field patterns into a network of mutually-coupled resonant oscillatory electric fields.

7. A device for developing and transmitting electromagnetic waves comprising a non-polar fluid-medium; means constructed and arranged to develop a sound field in said non-polar fluid-medium, said sound field comprising a series of molecular field patterns in said non-polar fluid-medium; means to partially confine said sound field; and electromagnetic-means comprising a high-potential power source arranged to impose a transitory alternating high-potential on said sound field and to periodically ionize the molecular field patterns of said sound field thereby to transform said ionized molecular field patterns into a network of mutually-coupled resonant oscillatory fields.

8. A device for developing and transmitting electromagnetic waves comprising a non-polar fluid-medium; means constructed and arranged to develop a sound field in said non-polar fluid-medium, said sound field comprising a series of molecular field patterns in said non-polar fluid-medium; means associated with said sound-field developing-means to vary the intensity of said sound field and hence the configuration of said molecular field patterns; and a transitory alternating high-potential imposed on said molecular field patterns to ionize the molecular field patterns of said sound field periodically and thereby transform said ionized molecular field patterns into a network of mutually-coupled resonant oscillating electric fields.

9. A device for developing and transmitting electromagnetic waves comprising a dielectric envelope having one closed end; a non-polar gaseous medium partially enclosed by said envelope; sound-producing means adjacent the one closed end of said envelope arranged to develop a sonic field in the non-polar gaseous medium within said envelope, said sonic field comprising stratifications of said non-polar gaseous medium having predetermined molecular field patterns; and an oscillating circuit comprising transitory induction-means cooperatively associated with said dielectric envelope to ionize the molecular field patterns of said sonic field periodically thereby to transform said ionized molecular field patterns into a network of mutually-coupled resonant oscillating electric fields.

10. A method of developing and transmitting radiant energy comprising the steps of impressing an electromotive force on a non-polar fluid-medium and then developing a series of ionized molecular field patterns within said fluid-medium by energizing said non-polar fluid-medium thereby to transform the ionized molecular field patterns into a network of mutually-coupled oscillatory electric fields.

ROBERT RADOM.

REFERENCES CITED

The following references are of record in the file of this patent:

UNITED STATES PATENTS

| Number | Name | Date |
|---|---|---|
| 974,762 | Fessenden | Nov. 1, 1910 |
| 1,945,039 | Hansell | Jan. 30, 1934 |
| 2,265,796 | Boersch | Dec. 9, 1941 |